United States Patent [19]

Hegemier et al.

[11] Patent Number: 5,232,587
[45] Date of Patent: Aug. 3, 1993

[54] STORMWATER INLET FILTER

[75] Inventors: Thomas E. Hegemier, 4516 Cliffstone Cove, Austin, Tex. 78735; Gerry R. Clayton, Dale; Stacy J. Gowing, Austin, both of Tex.

[73] Assignee: Tom Hegemier, Austin, Tex.

[21] Appl. No.: 844,200

[22] Filed: Mar. 2, 1992

[51] Int. Cl.⁵ .......................................... B01D 35/02
[52] U.S. Cl. ................... 210/162; 710/163; 710/170; 404/4
[58] Field of Search ............. 210/162, 163, 164, 170, 210/532.2; 404/2, 3, 4, 5

[56] References Cited

U.S. PATENT DOCUMENTS

| | | | |
|---|---|---|---|
| 232,948 | 10/1880 | Dernham | 210/163 |
| 530,816 | 12/1894 | Wright | 210/164 |
| 699,176 | 5/1902 | Hough | 210/163 |
| 809,201 | 1/1906 | Lutz | 404/4 |
| 1,060,338 | 4/1913 | Gschwind | 404/5 |
| 3,945,746 | 3/1976 | Bredbenner | 210/163 |
| 4,419,232 | 12/1983 | Arntyr et al. | 404/5 |
| 5,069,781 | 12/1991 | Wilkes | 210/164 |
| 5,133,619 | 7/1992 | Murfae et al. | 404/4 |

*Primary Examiner*—Stanley S. Silverman
*Assistant Examiner*—Robert James Popovics

[57] ABSTRACT

A filter without moving parts is placed in a storm sewer inlet that conveys stormwater flows. The filter is designed to fit a storm sewer inlet and rests on angle iron supports. The supports are attached to the storm sewer inlet walls below the inlet opening so the filter does not pond stormwater runoff in the contributing streets. The filter is composed of a perforated aluminum section riveted to a tubular steel frame. A weir and hydraulic opening for flow conveyance is provided adjacent to the filter. A grate type rack is constructed across the hydraulic opening. At least one handle is attached to the filter on the side of the inlet opening.

3 Claims, 1 Drawing Sheet

STORMWATER INLET FILTER

SUMMARY OF THE INVENTION

The present invention consists of a filter without moving parts that is placed on angle iron supports attached to the walls of a storm sewer inlet to filter debris, trash, and sediment that are transported by stormwater runoff. Presently, stormwater runoff flows unfiltered in to storm sewer conveyance systems leading to the deposition of the above materials in the storm sewer pipes and the receiving waterways. The maintenance operations to remove these items are costly and usually result in the flushing of the system to the receiving stream or lake. This operation is not only expensive but contributes to the non point source pollution problems that affect streams, rivers, and lakes.

The inlet filter is constructed of a tubular steel frame that supports a perforated aluminum frame. The perforated aluminum is utilized to retain sediment. The filter frames can be modified by deleting the perforated aluminum and substituting a tubular steel grated rack if the purpose of the filter is to only trap debris and other floatable materials. Perpendicular to the filter is a metal partition to prevent the non point source pollutants from moving across the filter and through the hydraulic opening. The partition weir and hydraulic opening are sized to convey the design flows of the storm sewer inlet so the filter does not adversely affect the drainage capacity of the inlet. A grated rack on the hydraulic opening is constructed to the frame to retain large floatables that may pass over the partition weir.

After several storms, the filter is inspected to determine if debris removal is required. If so, the filter is pulled through the throat of inlet by using the handle(s) that are welded to the filter frame. The debris from the filter is emptied into a receiving vehicle and the filter is slid back on to the angle iron supports in the storm sewer inlet. This operation is performed during dry weather periods so the storm sewer system is protected from the non point source pollutants during rainfall. An alternative maintenance procedure would be the use of a modified vacuum to withdraw the nonpoint source pollutants without removing the filter from the inlet.

BRIEF DESCRIPTION OF THE DRAWINGS

The stormwater filter frame for debris and sediment capture is depicted in FIGS. 1, 2, and 3.

DETAILED DESCRIPTION

Figure 1:
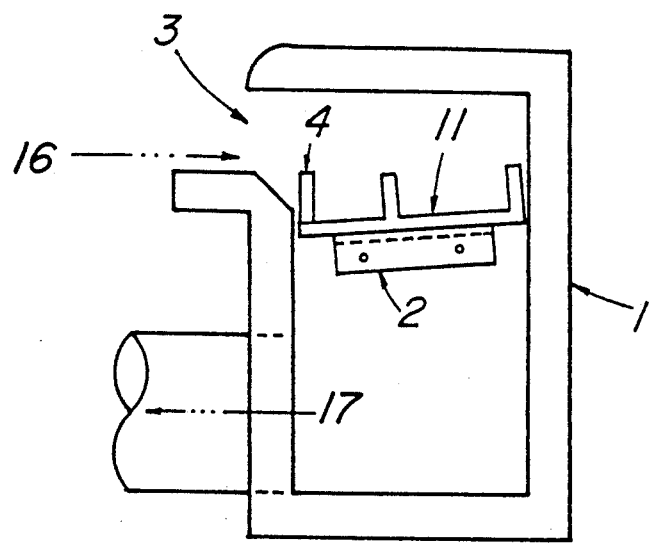
FIG. 1 is a profile view of the storm sewer inlet, angle iron supports, placement of the filter frame, and the maintenance operation.

As shown in FIG. 1 the overall objective is to insert the whole filter frame 11 in the storm sewer inlet 1 to trap debris and sediment transported by stormwater runoff and to provide cost effective maintenance. A direction of storm water inflow is indicated by the arrow 16 and the storm water outflow is indicated by the arrow 17.

The whole filter 11 used for this purpose comprises no moving parts and is constructed to be inserted in to the storm sewer inlet 1 on the angle iron supports 2 to be fitted below the inlet opening 3. The whole filter 11 is removed from the storm sewer inlet 1 through the inlet opening 3 by utilizing the handle(s) 4. After the debris is vacuumed or dumped from the filter frame 11 into a receiving vehicle, the filter frame 11 is inserted through the inlet opening 3 and placed back onto the angle iron supports 2 inside the storm sewer inlet 1.

Figure 2:
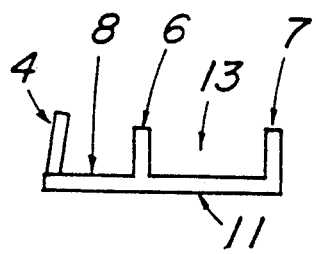
FIG. 2 is a profile view of the filter frame.

FIG. 2. The profile view shows the whole tubular steel filter frame 11 welded to the partition weir 6. The partition weir 6 is six inches in height and perpendicular to the filter frame 11. The handle(s) 4 are six inches wide and welded to the tubular steel filter frame 11 at a ten degree angle from the vertical axis and stand five inches above the filter frame 11. Handle(s) 4 are placed on center with one handle per five feet of inlet length. The perforated aluminum filter 8 is attached to whole filter frame 11 by pop rivets which are detailed in FIG. 3. The filter frame back 7 is four inches maximum outside dimension and continuously welded to the filter frame 11. The space between the partition weir 6 and the filter frame back 7 is labeled the hydraulic opening 13. The hydraulic opening 13 is designed to convey the storm water flows through the filter frame 11.

Figure 3:
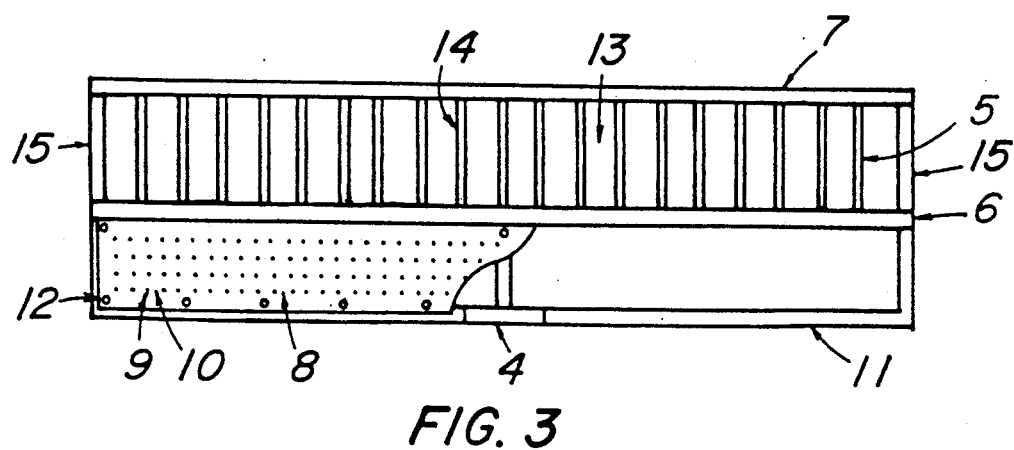
FIG. 3 is a plan view of the perforated aluminum filter, partition weir, and the hydraulic opening and their connection to the frame.

FIG. 3. The whole filter frame 11 is composed of individual steel bars 15 (one inch by one inch by 16 gauge) which are continuous welded at all corners and equally spaced across the inlet length. The perforated aluminum filter 8 is 0.032 inches thick with one-eighth inch perforations 9 at three-sixteenths inch stag 10 and is affixed to whole filter frame 11 by the use of one-eighth inch aluminum pop rivets 12 at six inches on center. The partition weir 6 is usually spaced nine inches inside distance from the filter frame back 7 but can be modified to accommodate design stormwater flow rate. The hydraulic opening 13 is nine inches in width and is composed of individual one-half inch diameter smooth bars 5 and spaced at three inches on center. The filter frame back 7 also utilizes the one half inch diameter smooth bars 5 at three inches on center to support the top of the frame back 7.

I claim:

1. A filter without moving parts comprising a filter frame having a filter compartment and a hydraulic opening mounted in a storm sewer inlet opening on angle iron supports that are located below the storm sewer inlet opening to filter storm water runoff by passing the runoff through a perforated aluminum filter in the filter compartment, said angle iron supports are situated at an angle to support the frame with the filter compartment being closer to the inlet opening and lower than the hydraulic opening, a partition weir separates the filter compartment and the hydraulic opening and retains pollutants in the filter compartment with runoff which has not passed through the perforated filter flowing over the weir and into the hydraulic opening, said hydraulic opening is grated with a smooth steel bar rack, said frame has at least one handle which is used to withdraw the filter frame from the inlet for maintenance and cleaning purposes.

2. A filter as recited in claim 1 wherein said filter frame is composed of a rust resistant, lightweight, durable material.

3. A filter as recited in claim 1 wherein a filter fabric material is attached to the top of the perforated aluminum filter to assist in sediment removal and facilitate maintenance.

* * * * *